US005468789A

United States Patent [19]

Lewis et al.

[11] Patent Number: 5,468,789
[45] Date of Patent: Nov. 21, 1995

[54] METHOD FOR MAKING RADIATION CURABLE SILICON CONTAINING POLYACRYLATE HARDCOAT COMPOSITIONS AND COMPOSITIONS MADE THEREBY

[75] Inventors: Larry N. Lewis, Scotia; George F. Medford, Ballston Lake; Arnold Factor, Scotia, all of N.Y.

[73] Assignee: General Electric Company, Schenectady, N.Y.

[21] Appl. No.: 304,299

[22] Filed: Sep. 12, 1994

[51] Int. Cl.$^6$ .......................... C08K 5/3432; C08L 43/04
[52] U.S. Cl. ................... 524/99; 524/100; 524/189; 524/237; 524/248; 524/259; 524/475; 524/476; 524/482; 524/806; 524/860; 524/866; 526/258; 526/265; 526/293; 526/294; 526/295; 526/311; 526/338; 526/340.3
[58] Field of Search ........................ 524/806, 860, 524/866, 99, 100, 189, 237, 248, 259, 475, 476, 482; 526/258, 265, 293, 294, 295, 311, 338, 340.3

[56] References Cited

U.S. PATENT DOCUMENTS

| | | | |
|---|---|---|---|
| 3,258,477 | 6/1966 | Plueddemann et al. | |
| 4,021,310 | 5/1977 | Shimizu et al. | 203/8 |
| 4,385,153 | 5/1983 | Ritter | 524/522 |
| 4,455,205 | 6/1985 | Olson et al. | 428/412 |
| 4,491,508 | 1/1985 | Olson | 428/412 |
| 4,528,324 | 7/1985 | Chung et al. | 524/860 |
| 4,709,067 | 11/1987 | Chu et al. | 556/440 |
| 5,242,719 | 9/1993 | Medford et al. | 428/412 |
| 5,258,225 | 11/1993 | Katsamberis | 428/412 |
| 5,271,968 | 12/1993 | Coyle et al. | 428/412 |
| 5,312,871 | 5/1994 | Mardare et al. | 526/265 |

OTHER PUBLICATIONS

E. G. Janzen, Spin Trapping, Chem. Eng. News 43, 50 (Sep. 27, 1965), Amer. Chem. Soc. (pp. 31–40).
I. H. Leaver et al., E.S.R. of Nitroxide Radicals, Aust. J. Chem. 1969, (pp. 1891–1900).
J. C. Bevington and N. A. Ghanem, The Mechanisms of Inhibition and Retardation in Radical Polymerizations. Part III, The Use of a Stable Free Radical as an Inhibitor J. of Polymer Science, 1956, (pp. 3506, 3507 and 3509).
R. C. Lamb et al., Organic Peroxides, III. The Behavior of Cyclohexaneformyl Peroxide in the Presence of Excess Stable Radicals. The Simultaneous Determination of Kinetics and Free Radical Efficiencies in the Thermal Decompositions of Free Radical Initiators, J. Phys. Chem. 1963, (pp. 914–917).
C. Anderson Evans, Spin Trapping, Aldrichimica Acta. vol. 12, No. 2, 1979 (pp. 23, 25 26–29).
P. D. Bartlett, Galvinoxyl (2,6–Di–tert–butyl–a–(3, 5–di–tert–butyl–4–oxo–2, 5–cyclohexadiene–1–ylidene)–p–tolyloxy) As a Scavenger of Shorter–lived Free Radicals, J. Chem. Soc. 1962 (99. 2596–2601).
J. F. Areizaga et al., Galvinoxyl As Scavenger in the Radical Polymerization of Styrene Initiated by AIBN, Makromol. Chem. Macromol. Symp. 20/21, 1988 (pp. 77, 79–82).
S. F. Nelsen, Azocumene. I. Preparation and Decomposition of Azocumene. Unsymmetrical Coupling Products of the Cumyl Radical, J. Am. Chem. Soc., 1965, (pp. 137–142).
L. N. Lewis et al., Ultraviolet–Curable, Abrasion–Resistant, and Weatherable Coatings with Improved Adhesion, J. of Applied Polymer Science, vol. 42, 1991, (pp. 1551–1556).
M. Stickler, Experimental Techniques in Free Radical Polymerization Kinetics, Makromol Chem. Macromol. Symp. 10/11, 1987, (pp. 17–69).

*Primary Examiner*—Mark Sweet
*Attorney, Agent, or Firm*—William H. Pittman

[57] ABSTRACT

A method is provided for making curable silicon containing acrylate silicone hardcoat compositions which employ an anaerobic gelation inhibitor such as galvinoxyl. Devolatilizing of an aqueous/organic solvent mixture from the silicon containing acrylate hardcoat formulation is conducted in an inert atmosphere. Acrylate hardcoat compositions imparting improved weathering resistance to thermoplastic substrates also are provided.

25 Claims, No Drawings

METHOD FOR MAKING RADIATION CURABLE SILICON CONTAINING POLYACRYLATE HARDCOAT COMPOSITIONS AND COMPOSITIONS MADE THEREBY

CROSS-REFERENCE TO RELATED APPLICATIONS

Reference is made to applications 08/304,300, 08/304,298 and 08/304,297, now U.S. Pat. No. 5,436,345, filed concurrently herewith, and Ser. No. 08/281,315.

BACKGROUND OF THE INVENTION

The present invention relates to a method for making a radiation curable silicon containing polyacrylate hardcoat composition. Vacuum devolatilizing under anaerobic conditions is provided of an organic solvent mixture of aqueous colloidal silica modified with an alkoxysilylacrylate and polyfunctional reactive acrylate in the presence of an anaerobic gelation inhibitor. A substantially volatile free radiation curable silicon containing polyacrylate hardcoat composition also is provided.

As shown by Chung, U.S. Pat. No. 4,478,876, a process is provided for applying a UV curable silicon containing polyacrylate hardcoat composition onto a substrate, such as a thermoplastic substrate. The UV cure of the Chung silicon hardcoat composition is effected in a non-inert atmosphere, such as air.

In the preparation of a UV curable silicon containing polyacrylate hardcoat composition, aqueous colloidal silica can be initially treated with an alkoxysilylacrylate such as methylacryloxypropyltrimethoxysilane. Water is then removed from the mixture in the form of an aqueous/organic solvent azeotrope. Prior to devolatilizing, a polyfunctional reactive acrylic monomer, such as hexanedioldiacrylate, can be added to the mixture to provide an acrylic matrix for the silylated colloidal silica. Experience has shown that gelation of the silicon containing polyacrylate hardcoat mixture can occur readily during the distillation step. An inhibitor, such as methylhydroquinone (MEHQ) has been used with some degree of success. However, as taught by Kurland, J.Poly. Sci.,Poly.Chem. Ed., 18 (1980) 1139, inhibitors such as MEHQ require oxygen to be effective. As a result, safety concerns have arisen concerning the distillation of large volumes of organic solvent at elevated temperatures in the presence of air or oxygen.

It would be desirable therefore to be able to produce radiation curable silicon containing polyacrylate hardcoat compositions in an economic and environmentally safe manner. As used hereinafter, the expression "radiation curable" means cure resulting from actinic radiation such as UV light, or particle radiation such as electron beam.

SUMMARY OF THE INVENTION

The present invention is based on the discovery that radiation curable silicon polyacrylate hardcoat compositions can be made in an economic and environmentally safe manner if an effective amount of an anaerobic gelation inhibitor, such as "galvinoxyl", having the formula,

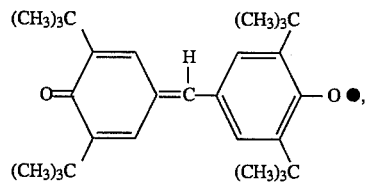

is substituted for MEHQ during the devolatilizing step. In addition, the use of an anaerobic gelation inhibitor during the formation of the radiation curable silicon containing polyacrylate hardcoat composition also has been found to enhance the stability of the resulting cured coating. As a result, the weatherability of composites of the cured hardcoat and an organic substrate, for example a thermoplastic substrate such as polycarbonate also has been improved.

STATEMENT OF THE INVENTION

There is provided by the present invention, a method for making a radiation curable silicon containing polyacrylate hardcoat composition comprising devolatilizing at a temperature in the range of about 25° C. to about 100° C. under an inert atmosphere, a mixture comprising, by weight, (i) 100 parts of a water miscible organic solvent,
(ii) 1 to about 200 parts of aqueous colloidal silica,
(iii) 0.5 to about 50 parts of alkoxysilylacrylate,
(iv) 10 to about 400 parts of reactive polyacrylic monomer, and
(v) an effective amount of anaerobic gelation inhibitor.

A preferred method for making the radiation curable silicon containing polyacrylate hardcoat compositions of the present invention comprises the steps of, (A) agitating at a temperature of 25° C. to about 100° C., a mixture comprising by weight,
　(vi) 100 parts of a water miscible organic solvent,
　(vii) 1 to about 200 parts of an aqueous colloidal silica dispersion, and
　(viii) 0.5 to about 50 parts of alkoxysilylacrylate, to produce a colloidal silica-alkoxysilylacrylate reaction product,
(B) adding to the resulting mixture of (A), from about 10 to about 400 parts of reactive acrylic monomer, and
(C) devolatilizing the resulting mixture of (B) under an inert atmosphere, at a temperature in the range of about 25 ° C. to about 100 ° C. in the presence of an effective amount of anaerobic gelation inhibitor.

In a further aspect of the present invention, there is provided a substantially volatile free radiation curable silicon containing polyacrylate hardcoat composition which is obtained by devolatilizing at a temperature in the range of about 25° C. to about 100 ° C. under anaerobic conditions, a mixture comprising by weight, (ix) 100 parts of a water miscible organic solvent,
(x) 1 to about 200 parts of aqueous colloidal silica,
(xi) 0.5 to about 15 parts of alkoxysilylacrylate,
(xii) 10 to about 400 parts of reactive acrylic monomer, and
(xiii) an effective amount of anaerobic gelation inhibitor.

Among the preferred alkoxysilylacrylates, there are included compounds having the formula,

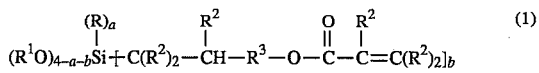

where R is a $C_{(1-13)}$ monovalent radical, $R^1$ is a $C_{(1-8)}$ alkyl radical, $R^2$ is selected from hydrogen, R radicals, or mixtures thereof, $R^3$ is a divalent $C_{(1-3)}$ alkylene radical, a is a whole number equal to 0 to 2 inclusive, b is an integer equal to 1–3 inclusive, and the sum of a+b is equal 1 to 3 inclusive.

Among the reactive polyfunctional acrylate monomers which can be used in the practice of the invention, there are included compounds within the formula,

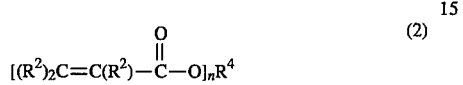

where $R^2$ is as previously defined, $R^4$ is a polyvalent organic radical, and n is an integer having a value of 2 to 4 inclusive.

R of formula (1) is more particularly selected from $C_{(1-8)}$ alkyl, such as methyl, ethyl, propyl, butyl, etc.; aryl radicals and halogenated aryl radicals, for example, phenyl, tolyl, xylyl, naphthyl, chlorophenyl, etc. Radicals included within $R^1$ are, for example, all of the $C_{(1-8)}$ alkyl radicals included within R. Radicals included within $R^2$ are for example hydrogen and the same or different radicals included within R. Divalent alkylene radicals included within $R^3$, are for example, methylene, ethylene, trimethylene, tetramethylene, etc. Divalent organic radicals included within $R^4$ are $R^3$ radicals, branched $C_{(3-8)}$ alkylene radicals, branched halogenated $C_{(3-8)}$ alkylene radicals, branched hydroxylated $C_{(3-8)}$ alkylene radicals, branched acrylate radicals, $C_{(6-13)}$ arylene radicals, for example, phenylene, tolylene, naphthylene, etc., halogenated $C_{(6-13)}$ arylene radicals, etc.

Included within the alkoxyacrylates of formula (1) are compounds having the formulas,

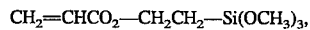

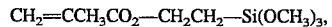

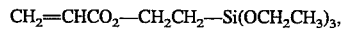

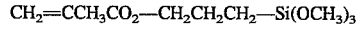

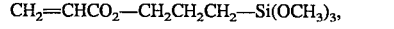

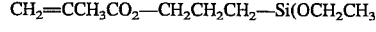

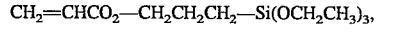

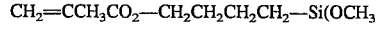

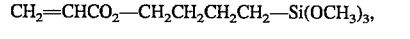

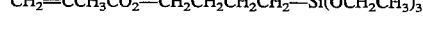

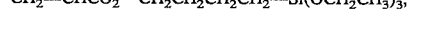

Some of the reactive polyfunctional acrylate monomers included within formula (2) are compounds having the formulas,

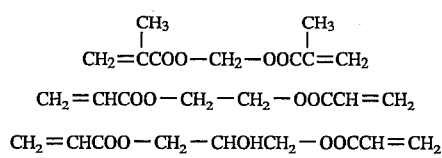

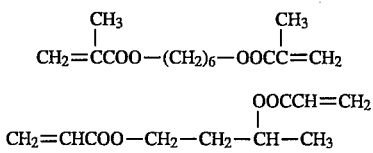

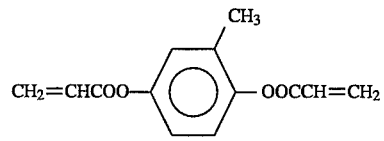

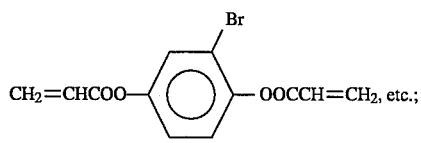

triacrylates of the formulas,

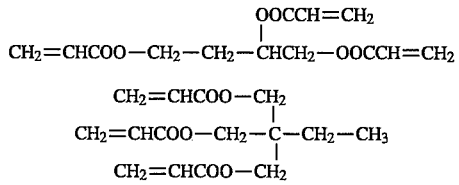

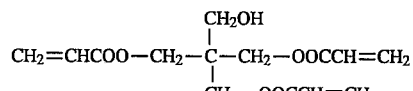

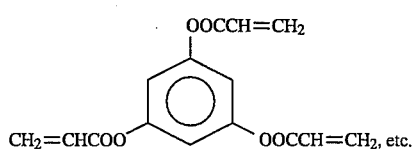

Tetraacrylate of the formulas,

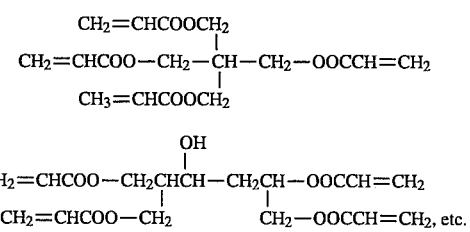

Another ingredient of the radiation curable silicon containing polyacrylate hardcoat compositions of the present invention, referred to hereinafter as the "hardcoat composition", is colloidal silica. Colloidal silica is a dispersion of submicron-sized silica ($SiO_2$) particles in an aqueous or other solvent medium. It is this polysiloxane backbone which provides the hardcoat composition with many of the advantages inherent in silicone products such as a wide range of resistance to environmental extremes.

Dispersions of colloidal silica are available from chemical manufacturers such as DuPont and Nalco Chemical Company. Colloidal silica is available in either acidic or basic form. However, for purposes of the present invention, it is preferable that the acidic form be utilized. It has been found that superior hardcoat properties can be achieved with acidic colloidal silica (i.e. dispersions with low sodium content). Alkaline colloidal silica also may be converted to acidic colloidal silica with additions of acids such as HCl or $H_2SO_4$ along with high agitation.

An example of a satisfactory colloidal silica for use in the hardcoat composition is Nalcoag 1034A, available from Nalco Chemical Company, Chicago, Ill. Nalcoag 1034A is a high purity acidic pH aqueous colloidal silica dispersion having a low $Na_2O$ content, a pH of approximately 3.1 and an $Si_2O$ content of approximately 34 percent by weight. The weight in grams or parts by weight of the colloidal silica includes its aqueous medium. Thus, for example, 520 grams of Nalcoag 1034A colloidal silica represents, approximately, 177 grams of $Si_2O$ by weight. A further example of colloidal silica available from Nissan Chemical Co. has 30% $Si_2O$ in isopropanol or methanol. However, experience has shown that gelation may occur unless the methanol mixture is used in combination with a branched alcohol, such as isopropanol to form a mixture having at least 20 % by weight of branched alcohol. In instances where colloidal silica is used in an alcohol in place of an aqueous system, it has been further found that at least sufficient water should be present to allow for alkoxysilylacrylate hydrolysis and preferably about 0.5 to about 5% by weight of the alcoholic silica dispersion.

The term colloidal silica is intended to present a wide variety of finely divided $SiO_2$ forms which can be utilized to form the hardcoat compositions of the present invention without the necessity of undue experimentation. Further description can be found in U.S. Pat. No. 4,027,073.

The hardcoat compositions can contain a single polyfunctional acrylate monomer, or a mixture of two polyfunctional monomers, such as diacrylate and a triacrylate. In addition, minor amounts of monoacrylate can be used in particular instances. Further, the hard coat composition of the present invention can contain non-acrylic radiation curable aliphatically unsaturated organic monomers in amounts up to 50% by weight of the hardcoat composition which include, for example, such materials as N-vinyl pyrrolidone, styrene, etc.

When the hardcoat composition contains a mixture of acrylate monomers, it is preferred that the ratio, by weight, of the diacrylate to the triacrylate be from about 10/90 to about 90/10. Exemplary mixtures of diacrylate and triacrylates include mixtures of hexanediol diacrylate with pentaerythritol triacrylate, hexanediol diacrylate and trimethylolpropane triacrylate, diethyleneglycol diacrylate with pentaerythritol triacrylate, and diethyleneglycol diacrylate with trimethylolpropane triacrylate.

The UV curable hardcoat compositions of the present invention also can contain a photosensitizing amount of a photoinitiator, i.e., an amount effective to effect the photocure in a non-oxidizing atmosphere, for example, nitrogen. Generally, this amount is from about 0.01% to about 10% by weight, and preferably from about 0.1% to about 7% by weight of the UV curable hardcoat composition.

Among the anaerobic gelation inhibitors which can be used in the practice of the invention there are included, galvinoxyl, 2,2,6,6-tetramethylpiperidinyloxy (TEMPO) having the formula,

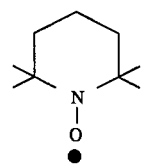

4-hydroxy-2,2,6,6-tetramethylpiperidinyloxy (4-hydroxy TEMPO) having the formula,

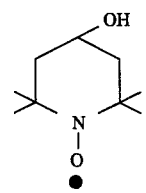

bis(2,2,6,6-tetramethyl-4-piperidinyloxy) sebacate diradical, 2,2-diphenyl-1-picrylhydrazyl(DPPH), having the formula,

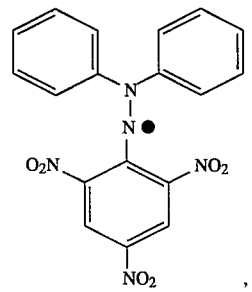

Banfield's radical having the formula,

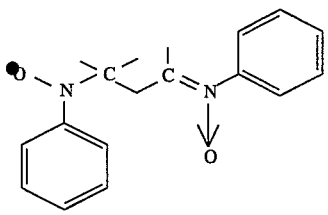

1,3,5-triphenyl verdazyl having the formula,

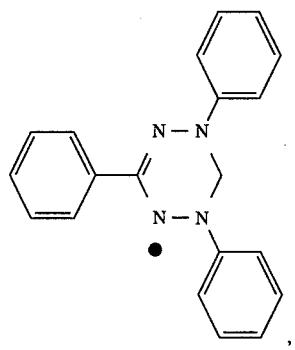

Koelsch's radical having the formula,

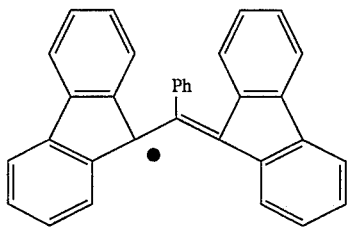

where Ph is phenyl, and 1-nitroso-2-naphthol having the formula,

In addition, benzofuroxan, other nitroso compounds such as nitrosobenzene and 2-methyl-2-nitroso propane dimer (Ntb), and nitrones, such as N-t-butyl-α-phenylnitrone can be used.

An effective amount of anaerobic gelation inhibitor is 100 ppm to 10,000 ppm based on the weight of reactive acrylic monomer used in the hardcoat composition.

Ketone-type photoinitiators which can be used in a non-oxidizing atmosphere, such as nitrogen, are for example, benzophenone,
acetophenone,
benzil,
benzaldehyde,
o-chlorobenzene,
xanthone,
thioxanthone,
2-chlorothioxanthone,
9,10-phenanthrenenquinone,
9,10-anthraquinone,
methylbenzoin ether,
ethylbenzoin ether,
isopropyl benzoin ether,
α,α-diethoxyacetophenone,
α,α-dimethoxyacetoophenone,
1-phenyl-1,2-propanediol-2-o-benzoyl oxime,
α,α-dimethoxy-α-phenylacetopheone and
methyl benzoyl formate.

The hardcoat compositions of the present invention also can contain UV absorbers or stabilizers such as resorcinol monobenzoate, 2-methylresorcinol dibenzoate, etc. The stabilizers can be present in an amount, based upon the weight of the hardcoat composition, exclusive of any additional solvent which may optionally be present, of from about 0.1 to 15 weight percent, preferably from about 3 to about 15 weight percent. The UV cured coating composition can contain from about 1 to about 15% by weight of stabilizers based on the weight of UV curable coating composition.

The hardcoat compositions of the present invention can contain various flatting agents, surface active agents, thixotropic agents, UV light stabilizers and dyes.

Various surface-active agents also can be present, including anionic, cationic and nonionic surface-active agents are described in Kirk-Othmer Encyclopedia of Chemical Technology, Vol. 19, Interscience Publishers, New York, 1969, pp. 507–593, and Encyclopedia of Polymer Science and Technology, Vol. 13, Interscience Publishers, New York, 1970, pp. 477–486, both of which are incorporated herein by reference.

In the practice of the present invention, the hardcoat composition can be made by blending together the aqueous colloidal silica, the alkoxysilyl acrylate, the polyfunctional acrylic monomer or mixtures thereof, the UV photosensitizer, and optionally any of the other aforementioned additives. In one blending procedure, the alkoxysilyl acrylate can be hydrolyzed in the presence of aqueous colloidal silica and a water miscible alcohol. In another procedure, the aqueous colloidal silica can be added to the alkoxysilylacrylate which has been hydrolyzed in aqueous alcohol.

Suitable organic solvents which can be used in the preparation of the hard coat composition are preferably alcohols and include, for example, any water miscible alcohol, for example, methanol, ethanol, propanol, butanol, etc., or ether alcohols, such as ethoxyethanol, butoxyethanol, methoxypropanol, etc. In a further procedure, aqueous colloidal silica and the alkoxysilylacrylate are combined and stirred until hydrolysis has been effected. The hydrolysis of the alkoxysilylacrylate can be accomplished at ambient conditions, or can be effected by heating the hydrolysis mixture to reflux for a few minutes. In instances where an alcohol miscible colloidal silica is employed, water can be added such as 0.05 part to about 5 parts of water, and preferably 0.05 to about 1.5 part.

Although the order of addition of the various ingredients in the hardcoat compositions of the present invention is not critical, it is preferred to add the polyfunctional acrylic monomer, or mixture thereof, to the above described mixture of hydrolyzed alkoxysilylacrylates and colloidal silica. Preferably, the polyfunctional acrylic monomer or mixtures thereof is added to the mixture of alkoxysilylacrylate and colloidal silica while it is stirring in a suitable hydrolysis medium, such as an aqueous solution of a water miscible alcohol as previously described.

In preparing the solventless hardcoat compositions of the present invention, an azeotropic mixture of water and alcohol can be distilled from the formulation. In instances where no alcohol is utilized in the initial hydrolysis mixture, sufficient alcohol can be added to facilitate the removal of water by distillation. Other solvents, for example, toluene, or other aromatic hydrocarbons, can be added to facilitate the removal of water.

It has been found that at least one part of alkoxysilylacrylate, per 10 parts of $SiO_2$ should be used in the UV curable composition to minimize the formation of gel.

The hardcoat compositions of the present invention are based on silicon-containing ingredients due to the condensation of colloidal silica and the alkoxysilylacrylate. A variation of the silicon content of the hardcoat composition has been found to influence such physical properties as the abrasion resistance of the resulting hardcoat.

The adhesion lifetime of the hardcoat on an organic substrate, such as a thermoplastic or thermoset substrate can also be enhanced by optimizing the formulation of the hardcoat composition. Suitable thermoplastic substrates which can be utilized in the practice of the present invention to produce shaped thermoplastic articles having enhanced abrasion resistance are, for example, Lexan polycarbonate, Valox polyester, Mylar polyester, Ultem polyetherimide, PPO polyphenyleneoxide, high density polyethylene and polymethylmethacrylate. Additional substrates such as wood, metals such as steel, aluminum, and metallized thermoplastics also can be used.

In order that those skilled in the art will be better able to practice the invention, the following examples are given by way of illustration and not by way of limitation. All parts are by weight.

EXAMPLE 1

A mixture of 86.9 g of Nalco 1034A of the Nalco chemical company (an aqueous colloidal silica dispersion having 34% of $SiO_2$), 200 ml of isopropanol, (IPA), 13g of methylacryloxypropyltrimethoxy-silane (MAPTMS) and 0.2 g of galvinoxyl was heated and stirred at 60° C. for 2 hr with nitrogen bubbling through the mixture. There was then added to the mixture, 36.2 g of hexanedioldiacrylate (HDDA) and 371 ml of isopropanol and the mixture was vacuum stripped at <50 mm Hg with a nitrogen bleed. There was obtained 74 g of an oil having a viscosity of 83 cps. Based on method of preparation, the oil, referred to hereinafter as the "galvinoxyl oil" was a silicon containing polyacrylate hardcoat composition. An ungelled product was obtained having a viscosity of 120 cps when 0.1 g of galvinoxyl was used following the same procedure.

An oil, referred to hereinafter as the "MEHQ oil" having a viscosity of 69 cps was obtained when the above procedure was repeated, using 0.07 g of para methoxy phenol (MEHQ) and 1.4 g of a 1% solution of sodium acetate in methanol in place of the galvinoxyl. In addition, an air bleed was used during the initial heating and stirring stage and the subsequent devolatilizing stage.

UV curable silicon containing polyacrylate hardcoat compositions were prepared by respectively mixing together 10 g of the galvinoxyl oil, or 10 g of the MEHQ oil with 10 g of trimethanolpropanetriacrylate, 1.2 g of methylbenzoyl formate (VYCURE photoinitiator of AKZO Inc.) and 25 g of isopropanol. The respective UV curable coating compositions were flow coated onto a 4"×4"×¼" polycarbonate plaque and cured under U.V.light at a rate of 20 ft/min in air. Using a Gardner model XL colorimeter, the YI of the galvinoxyl oil coating was found to be 0.8, while the MEHQ oil coating was found to be 1.3.

EXAMPLE 2

Additional UV curable silicon containing polyacrylate hardcoat oils were prepared in accordance with the procedure of example 1 using additional anaerobic gelation inhibitors under an inert atmosphere. The following results were obtained, where "GI" is gelation inhibitor:

TABLE 1

| GI | Parts (g) | Oil Viscosity (CPS) |
|---|---|---|
| 4-hydroxy TEMPO* | 0.1 | 72 (yellow) |
| N-t-butyl-α-phenyl nitrone | 0.5 | 138 (yellow) |
| 2,2-diphenyl-1-picryl-hydrazyl hydrate (DPPH) | 0.1 | 88 (purple) |
| MEHQ | 0.5 | gell |

*4-hydroxy-2,2,6,6-tetramethylpiperidinyloxy

EXAMPLE 3

A mixture of 2250 g of isopropanol, 70 g of methylacryloxypropyltrimethoxysilane, 468.3 g of Nalco 1034A (34% by weight pH 3 colloidal silica) and 0.2 g of galvinoxyl was heated at reflux for 1.5–2 hrs and the bath temperature did not exceed 100. Then, 195.3 g of hexanedioldiacrylate was added followed by stirring for about 5 minutes. An isopropanol/$H_2O$ azeotrope was removed by vacuum distillation, with pressure maintained about 70 mm and a bath temperature of ca. 60° C. During the devolatilizing procedure, a constant flow of air from the gas inlet was maintained. The final yield of 403 g of a free flowing yellow liquid.

Coating formulations were prepared by adding 7 phr of a UV screen "BSEX" (2-(2H-benzotriazole-2-yl)-4-t-octylphenylbenzene sulfonate) and 2 phr of a hydroxybenzophenone (Darocure 1664 photoinitiator of E Merk Co.). The coating formulations contained either MEHQ or galvinoxy as an inhibitor. A third formulation with 100 ppm galvinoxyl was prepared by adding 40 mg in place of 0.2 g inhibitor. Fifteen mil polycarbonate films were coated on a cold cast line. A related cold cast procedure is shown by D. J. Coyle et.al U.S. Pat. No. 5,271,968. In the present example, a nip pressure of 15 psi, cure speed of 50 feet/min, roll temperature of 105° F., and a rubber roll durometer of 55 was used. The samples were then post cured in a PPG processor at 50 feet/min in air using two 10 inch 300 watt/inch medium pressure mercury lamps.

Coatings were prepared as above except that the level of BSEX was increased to 10 phr and the cure was accomplished on the cold cast line at a nip pressure of 20 psi, cure speed of 40 feet/min and roll temperature of 108° F. Coatings were inhibited with either 500 ppm MEHQ or 100 ppm galvinoxyl. These coatings employed 2 phr Darocure 1664 photoinitiator or 2 phr diethoxyacetophenone (DEAP) photoinitiator. The following results were obtained, where Abrasion Resistance was measured after 500 Taber abrasion cycles, QUV photoaging was conducted using a cycle of 8 hours at 70° C. irradiation under UVB lights dry and 4 hours at 50° C. dark:

TABLE 2

| Inhibitor (Ppr) | Initiator | Abrasion Resistance | QUV (1200 Hours) | |
| --- | --- | --- | --- | --- |
| | | | Δ % Haze | ΔYI |
| MEHQ (500) | 1664 | 7.1 | 5.4 | 2.4 |
| galvinoxyl (100) | 1664 | 6.5 | 4.6 | 2.0 |
| galvinoxyl (500) | 1664 | 7.3 | 2.6 | 3.0 |
| MEHQ (500) | DEAP | 7.9 | 9.7 | 7.8 |
| galvinoxyl (100) | DEAP | 6.8 | 5.5 | 5.7 |
| MEHQ (500) | 1664 | 6.8 | 3.1 | 7.3 |
| galvinoxyl (100) | 1664 | 6.5 | 2.8 | 5.4 |

The results in Table 1 and 2 show that a wide variety of anaerobic gelation inhibitors can be used to make valuable UV curable acrylate containing silicone hardcoat compositions within the scope of the present invention. It was further found that a UV cured coating prepared from the DPPH oil of Table 1 in accordance with the procedure of example 1, provided a ΔYI value substantially similar to the MEHQ oil coating.

Although the above examples are directed to only a few of the very many variables which can be used in the practice of the present invention, a much broader scope of the invention can be found in the description preceding these examples.

What is claimed is:

1. A method for making a radiation curable silicon containing polyacrylate hardcoat composition comprising devolatilizing at a temperature in the range of about 25° C. to about 100° C. under a non-oxidizing atmosphere, a mixture comprising, by weight, (i) 100 parts of a water miscible organic solvent, (ii) 1 to about 200 parts of an aqueous colloidal silica dispersion, (iii) 0.5 to about 50 parts of alkoxysilylacrylate, (iv) 10 to about 400 parts of reactive acrylic monomer, and (v) an effective amount of anaerobic gelation inhibitor selected from the group consisting of 2,2,6,6-tetramethylpiperidinyloxy, 4-hydroxy- 2,2,6,6-tetramethylpiperidinyloxy, bis(4-hydroxy-2,2,6,6-tetramethylpiperidinyloxy sebacate diradical, 2,2-diphenyl-1-picrylhydrazyl, 1,3,5-triphenylverdazyl, 1-nitroso-2-naphthol, a nitrone,

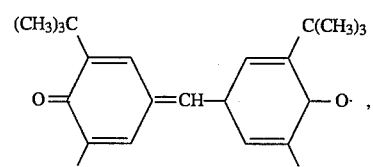

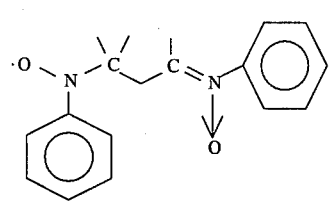

and

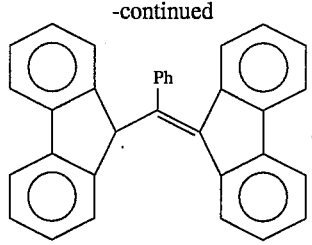

2. A method in accordance with claim 1, where the water miscible organic solvent is isopropanol.

3. A method in accordance with claim 1, where the silylacrylate is methylacryloxypropyltrimethoxysilane.

4. A method in accordance with claim 1, where the reactive acrylic monomer is hexanedioldiacrylate.

5. A method in accordance with claim 1, where the anaerobic gelation inhibitor is represented by the formula

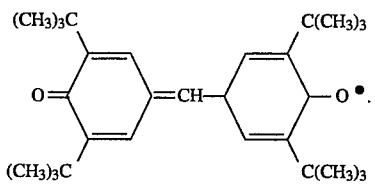

6. A method in accordance with claim 1, where the anaerobic gelation inhibitor is 4-hydroxy-2,2,6,6-tetramethylpiperidinyloxy.

7. A method in accordance with claim 1, where the anaerobic gelation inhibitor is 2,2,6,6 -tetramethylpiperidinyloxy.

8. A method in accordance with claim 1, where the anaerobic gelation inhibitor is 2,2-diphenyl-1-picryl-hydrazyl.

9. A method in accordance with claim 1, where the anaerobic gelation inhibitor is represented by the formula

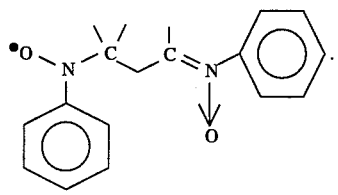

10. A method in accordance with claim 1, where the anaerobic gelation inhibitor is 1,3,5,-triphenyl verdazyl.

11. A method in accordance with claim 1, where the anaerobic gelation inhibitor is represented by the formula

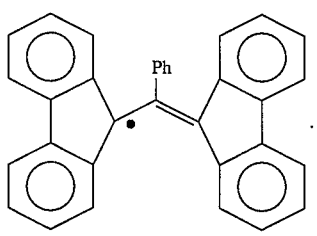

12. A method in accordance with claim 1, where the anaerobic gelation inhibitor is 1-nitroso-2-naphthol.

13. A method in accordance with claim 1, where the anaerobic gelation inhibitor is a nitrone.

14. A method in accordance with claim 1, where the anaerobic gelation inhibitor is bis(2,2,6,6-tetramethyl-4-piperidinyloxy) sebacate diradical.

15. A substantially volatile free radiation curable silicon containing polyacrylate hardcoat composition which is obtained by devolatilizing at a temperature in the range of about 25° C. to about 100° C. under anaerobic conditions, a mixture comprising by weight, (ix) 100 parts of a water miscible organic solvent, (x) 1 to about 200 parts of aqueous colloidal silica, (xi) 0.5 to about 50 parts of alkoxysilylacrylate, (xii) 10 to about 400 parts of a reactive acrylic monomer, and (xiii) an effective amount of an anaerobic gelation inhibitor selected from the group consisting of 2,2,6,6-tetramethylpiperidinyloxy, 4-hydroxy-2,2,6,6-tetramethylpiperidinyloxy, bis(4-hydroxy-2,2,6,6-tetramethylpiperidinyloxy sebacate diradical, 2,2-diphenyl-1-picrylhydrazyl, 1,3,5-triphenylverdazyl, 1-nitroso-2-naphthol, a nitrone,

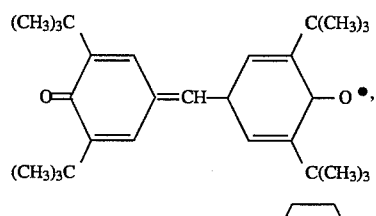

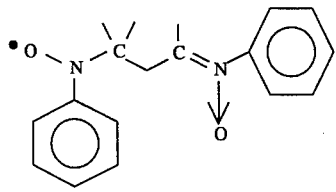

and

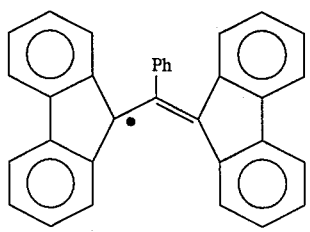

16. A hardcoat composition in accordance with claim 15, which was made using

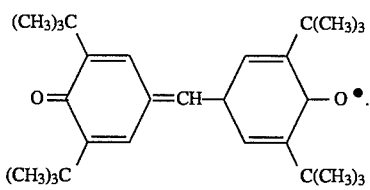

17. A hardcoat composition in accordance with claim 15, which was made using 4-hydroxy-2,2,6,6-tetramethylpiperidinyloxy.

18. A hardcoat composition in accordance with claim 15, which was made using 2,2,6,6-tetramethylpiperidinyloxy.

19. A hardcoat composition in accordance with claim 15, which was made using 2,2-diphenyl-1-picryl-hydrazyl.

20. A hardcoat composition in accordance with claim 15, which was made using

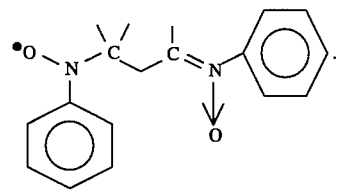

21. A hardcoat composition in accordance with claim 15, which was made using 1,3,5,-triphenyl verdazyl.

22. A hardcoat composition in accordance with claim 15, which was made using

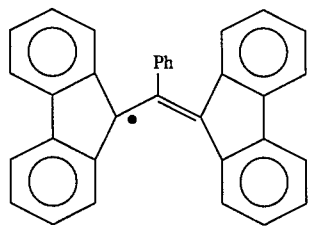

23. A hardcoat composition in accordance with claim 15, which was made using 1-nitroso-2-naphthol.

24. A hardcoat composition in accordance with claim 15, which was made using a nitrone.

25. A hardcoat composition in accordance with claim 15, which was made using bis(2,2,6,6-tetramethyl-4-piperidinyloxy) sebacate diradical.

* * * * *

UNITED STATES PATENT AND TRADEMARK OFFICE
CERTIFICATE OF CORRECTION

PATENT NO. : 5,468,789

DATED : November 21, 1995

INVENTOR(S) : Larry N. Lewis, et al

It is certified that error appears in the above-indentified patent and that said Letters Patent is hereby corrected as shown below:

Title page, column 2, line 17 should read --of Shorter-lived Free Radicals, J. Am. Chem. Soc. 1962 (pp.--.

Signed and Sealed this

Fifth Day of March, 1996

Attest:

BRUCE LEHMAN

Attesting Officer

Commissioner of Patents and Trademarks